US006783882B2

(12) United States Patent
Schmidt

(10) Patent No.: US 6,783,882 B2
(45) Date of Patent: Aug. 31, 2004

(54) METHOD AND APPARATUS FOR MAINTENANCE OF FUEL CELL CATHODE AIR QUALITY WITH BREATHABLE HYDROPHOBIC MEMBRANE AIR FILTER

(75) Inventor: Jeffrey A. Schmidt, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 09/971,418

(22) Filed: Oct. 4, 2001

(65) Prior Publication Data

US 2004/0072046 A1 Apr. 15, 2004

Related U.S. Application Data

(60) Provisional application No. 60/269,648, filed on Feb. 14, 2001.

(51) Int. Cl.[7] ................................................. H01M 8/04
(52) U.S. Cl. ........................................ 429/34; 429/13
(58) Field of Search ............................ 96/4; 210/500.21, 210/500.27; 429/6, 12, 13, 27, 34

(56) References Cited

U.S. PATENT DOCUMENTS

| | | | | |
|---|---|---|---|---|
| 5,401,589 A | * | 3/1995 | Palmer et al. ................. | 429/13 |
| 5,429,885 A | * | 7/1995 | Stockburger et al. .......... | 429/13 |
| 5,645,950 A | * | 7/1997 | Benz et al. .................... | 429/13 |
| 5,773,162 A | | 6/1998 | Surampudi et al. ........... | 429/39 |
| 6,007,930 A | | 12/1999 | Adams et al. ................. | 429/13 |
| 6,258,276 B1 | | 7/2001 | Mika et al. | |
| 6,432,177 B1 | * | 8/2002 | Dallas et al. .................. | 96/132 |
| 6,521,024 B1 | * | 2/2003 | Akahori et al. ................ | 96/4 |

FOREIGN PATENT DOCUMENTS

| | | |
|---|---|---|
| JP | 10-064561 | 3/1998 |
| WO | WO 00/55877 | * 9/2000 |

OTHER PUBLICATIONS

Pall Corporation, Healthcare Product Information Sheet for "Versapor®R Membrane", p. 33, no date available.

Pall Corporation, Healthcare Product Information Sheet for "Emflon®PTFE Membranes", p. 32, no date available.

Pall Corporation, Healthcare Product Information Sheet for "Supor®R Membrane", p. 35, no date available.

Donaldson High Purity Products, Product Information Sheet for "PTFE Breather Vent Filters", no date available.

Pall Corporation, Product Information Brochure for Pall Specialty Materials, pp. 1–12, no date available.

Johnson, Larry and Schultze, Dirk, "Breathable TPE Films for Medical Applications", *Medical Device & Diagnostic Industry*, pp. 30–38, Jul. 2000.

(List continued on next page.)

*Primary Examiner*—Susy Tsang-Foster
(74) *Attorney, Agent, or Firm*—Sheridan Ross P.C.

(57) ABSTRACT

A method and apparatus for maintaining fuel cell cathode air quality are provided. In particular, the method and the apparatus of the present invention provide air filtration that excludes liquids and solids from a fuel cell enclosure. According to one embodiment of the present invention, the fuel cell enclosure can withstand being submerged in water, without allowing contaminants to enter the fuel cell enclosure. The depth at which the fuel cell could be submerged is dependant upon the pore size of the filter membrane. The present invention provides a filter having a gas permeable, hydrophobic, microporous polymer film to exclude material detrimental to the operation of the fuel cell. The invention allows a fuel cell apparatus to be provided that is capable of being submerged in water and exposed to environmental contaminants without damage to the fuel cell.

25 Claims, 6 Drawing Sheets

OTHER PUBLICATIONS

Alter, Jason M., Ph.D., "Hydrophobic Through and Not Through", *Product Design and Development Tech Update, Pall Corporation, Jan. 1998* (reprinted from *industrial Design & Development*, Cahners Business Information, Jan. 1998).

Stuart, Mark, "Using Hydrophobic Membranes to Protect Gas Sensors", Pall Corporation, May, 1998 (reprinted from *Sensors*, vol. 15, No. 5, Helmers Publishing, Inc., May 1998).

Sakamoto, S. et al., "Study of the Factors Affecting PEFC Life Characteristic", pp. 141–144, no date.

Moore, Jon M. et al., "The Effects of Battlefield Contaminants of PEMFC Performance", *Journal of Power Source 85*, pp. 254–260, Elsevier Science S.A., 2000, no month.

* cited by examiner

METHOD AND APPARATUS FOR MAINTENANCE OF FUEL CELL CATHODE AIR QUALITY WITH BREATHABLE HYDROPHOBIC MEMBRANE AIR FILTER

CROSS REFERENCE TO RELATED APPLICATIONS

Priority is claimed from U.S. Provisional Patent Application No. 60/269,648, filed Feb. 14, 2001, entitled "METHOD AND APPARATUS FOR MAINTENANCE OF FUEL CELL CATHODE AIR QUALITY WITH BREATHABLE HYDROPONIC MEMBRANE AIR FILTER", the disclosure of which is incorporated herein by reference in its entirety.

FIELD OF THE INVENTION

The present invention relates to fuel cells. In particular, the present invention relates to the maintenance of fuel cell cathode air quality.

BACKGROUND OF THE INVENTION

Fuel cells provide an increasingly popular way to generate electricity. Fuel cells are characterized by a favorable power density and a high specific power output. In addition, fuel cells generally produce benign waste products. As a result of the benefits of fuel cells, they are being considered for and applied to an expanding number of applications requiring electrical power.

Fuel cells can be beneficially employed in connection with a wide variety of devices requiring a portable electrical power supply. For example, fuel cells have been used in connection with electric automobiles. The fuel cell is desirable in such applications because they are capable of providing a high specific power output in a relatively lightweight and compact package. In addition, fuel cells that produce harmless waste products are available. For example, the byproduct of the reaction between hydrogen and oxygen, the two components of a typical fuel cell, is water. Fuel cells are also useful in connection with providing a reliable power supply for various other devices that might be used in remote locations and/or in connection with portable devices. For example, fuel cells can be used as a power source for radios and other communication devices, global positioning system receivers, portable computer systems, night vision equipment and other devices. As can be appreciated, many such devices can be beneficially employed in man-portable systems. For example, such systems may be used by outdoor enthusiasts, soldiers, surveyors, or other persons requiring a reliable and easily portable source of electrical power.

In a typical fuel cell, hydrogen molecules ($H_2$) are converted to electrons ($e^-$) and protons ($H^+$) in a platinum catalyst, thus forming the anode of the fuel cell. The protons flow through a proton exchange membrane (PEM). At the cathode of the fuel cell, the protons are combined with oxygen molecules ($O_2$) and electrons to form water ($H_2O$). Electrical devices may be provided with electrical power by interconnecting them between the cathode and the anode of the fuel cell.

In a fuel cell such as the one described above, the proton exchange membrane may be a polymer electrolyte membrane. The membrane may be constructed from a perfluorinated polymer based material (e.g. NAFION, available from E.I. du Pont de Nemours and Company), that is hydrophilic and that contains sulphonic acid groups that form negatively charged transfer sites, allowing the membrane to conduct positively charged ions. Accordingly, the positively charged hydrogen ions are capable of passing through the membrane to react with oxygen molecules and electrons at the cathode to form water. In this way, the natural tendency of the protons to oxidize and form water is used to produce electricity that can be applied to the performance of useful work. The chemical equations for the above-described processes are as follows:

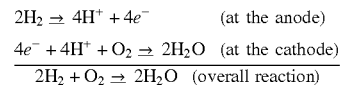

In a single fuel cell, the above-described reaction produces an electrical potential of about 0.7 Volts. Therefore, in a typical application, fuel cells are combined into a fuel cell stack to produce a desired voltage. Furthermore, by increasing the surface area of the individual fuel cells, the current producing capacity of the fuel cell may be increased.

One of the advantages of fuel cells is that they are capable of utilizing oxygen in the ambient atmosphere as one of the components of the reaction used to generate electrical power. However, the proton exchange membrane of the fuel ceil is vulnerable to fouling by contaminants. In particular, the negatively charged transfer sites in the proton exchange membrane can become irreversibly occupied by metal ions (e.g. $Na^+$, $Mg^{2+}$, $Fe^{2+}$, $Cr^+$, $Ni^{2+}$, etc.), preventing protons from reacting with oxygen at the cathode. Such ions may be introduced to the interior of the fuel cell in a liquid solution, or as airborne salts. Therefore, measures must be taken to exclude liquids and salts from the fuel cell. This need is particularly acute when use of the fuel cell in marine environments is contemplated.

Conventional methods for excluding chemical contaminants from the fuel cell cathode air stream have included direct particle filtration in combination with a consumable chemical getter material. The getter material may include an adsorption material such as a zeolite or activated charcoal or other substance that reacts chemically with the contaminants to trap them and thereby filter them from the air stream. However, such methods are incapable of preventing liquid water from being aspirated into the air stream and fouling the getter material. If the getter material becomes overwhelmed by the amount of water that has been aspirated, the water may come in contact with the proton exchange membrane and ions in the water may foul the proton exchange membrane.

Conventional systems for preventing liquids from being aspirated into a fuel cell and fouling the proton exchange membrane have used valves or other active measures. However, such active measures are unreliable, and typically admit at least some water into the fuel cell, hastening the need to replenish the getter material or allowing at least partial fouling of the proton exchange membrane. Accordingly, conventional methods do not provide a satisfactory method or apparatus for protecting fuel cells from fouling by contaminants carried by liquids, particularly where the fuel cell will likely be exposed to water or airborne salts.

For the reasons set forth above, there is a need for a method and apparatus for maintaining fuel cell cathode air quality. In particular, there is a need for a method and apparatus capable of maintaining fuel cell cathode air stream quality reliably, and without a need for complicated and expensive active components. Furthermore, there is a need for such a method and apparatus that are capable of excluding liquids and airborne salts from a cathode air stream without requiring the use of consumable components. Additionally, the method and apparatus should be reliable in operation and inexpensive to implement.

SUMMARY OF THE INVENTION

In accordance with the present invention, a method and an apparatus for maintaining the quality of a fuel cell cathode air stream are provided. In particular, the method and apparatus of the present invention allow liquids and airborne salts to be excluded from a cathode air stream without the use of active components. The method and apparatus of the present invention generally provide for the filtering of a cathode air stream through a filter formed from a gas permeable, hydrophobic, microporous, polymer film. The use of such a filter allows for the reliable operation of a fuel cell even in an environment in which airborne salts are prevalent or in which immersion of the fuel cell is likely, such as in marine environments.

According to one embodiment of the present invention, a substantially waterproof enclosure is provided for housing a fuel cell. A filter having a gas permeable, hydrophobic, microporous, polymer membrane is provided in a wall of the enclosure, to allow air to be admitted into the enclosure. The pore size of the membrane is selected to provide a desired water intrusion pressure, while admitting a required flow of air for a given filter surface area.

According to another embodiment of the present invention, a pump is housed within the enclosure. Depending on the demand on the fuel cell for electrical current, the pump draws air through the filter and provides that air to the fuel cell cathode. According to a further embodiment of the present invention, exhaust from the fuel cell is allowed to exit the enclosure through a check valve.

According to one embodiment of the present invention, a method for maintaining the air quality of a cathode air stream is provided. According to the method, a cathode air stream is drawn through a gas permeable, hydrophobic, microporous, polymer film, after which it is provided to the fuel cell cathode. According to another embodiment of the present invention, the method for maintaining the quality of a cathode air stream includes sizing the pores of the filter membrane to exclude particles of greater than a selected diameter, and to exclude liquid water at up to a selected pressure.

Additional advantages of the present invention will become readily apparent from the following discussion, particularly when taken together with the accompanying drawings.

DETAILED DESCRIPTION

In accordance with the present invention, a method and apparatus for maintaining fuel cell cathode air quality using a breathable hydrophobic membrane as an air filter is provided.

Figure 1:
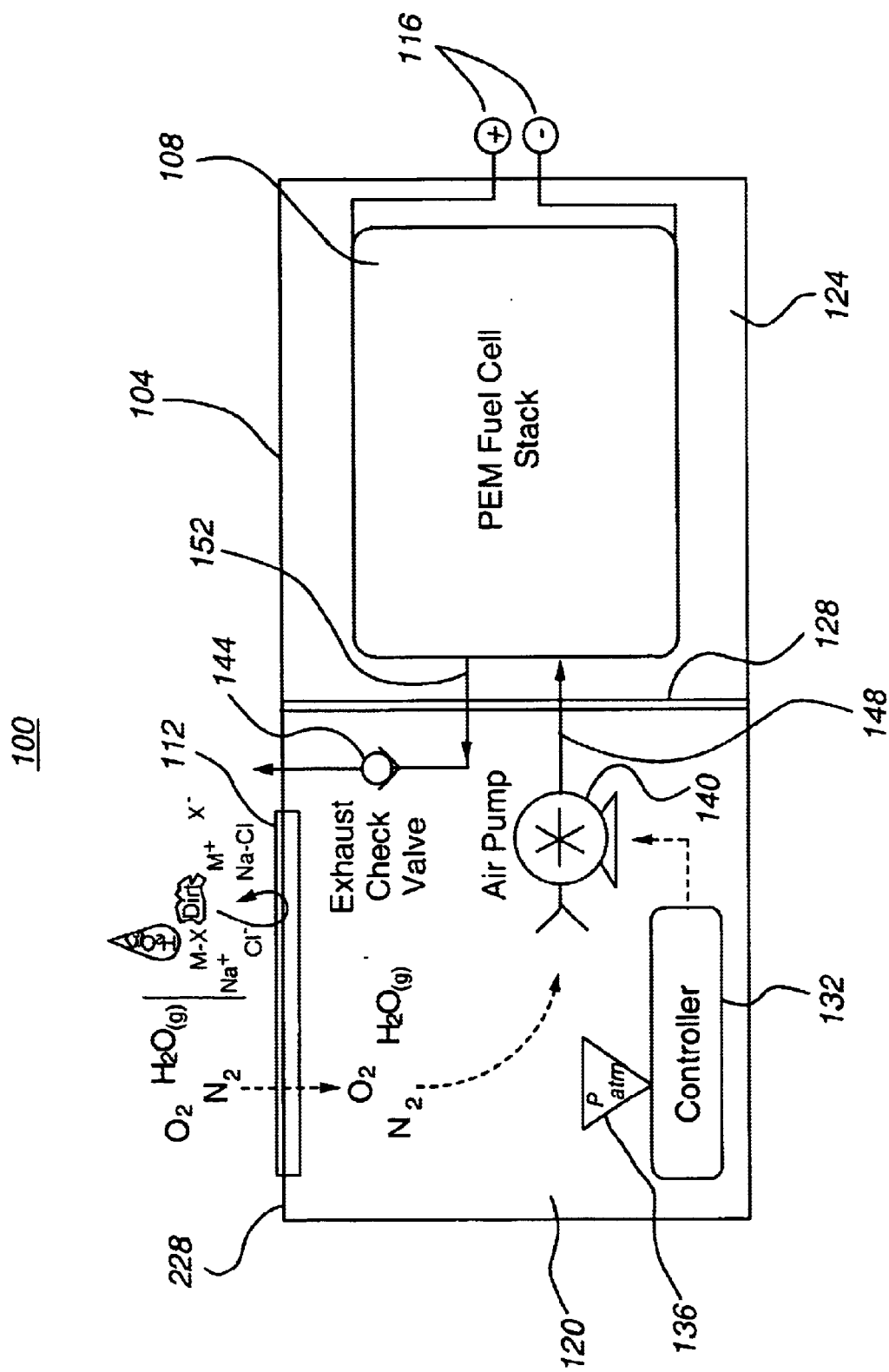
FIG. 1 depicts in schematic form the components of a fuel cell apparatus in accordance with one embodiment of the present invention.

With reference now to FIG. 1, a fuel cell system 100, in accordance with an embodiment of the present invention, is depicted in schematic form. The fuel cell system 100 generally includes a substantially waterproof enclosure 104, a proton exchange membrane (PEM) fuel cell stack 108 disposed within the substantially waterproof enclosure 104, and a filter assembly 112 for admitting a flow of filtered air into the enclosure 104. As will be appreciated by those of ordinary skill in the art, the proton exchange membrane fuel cell stack 108 operates by oxidizing protons supplied from a store of hydrogen (not shown). A flow of electrons resulting from the oxidation of the protons is made available at contacts 116. By interconnecting the contacts 116 to devices requiring electrical power, the fuel cell system 100 can be used to perform useful work.

In the embodiment illustrated in FIG. 1, the interior of the enclosure 104 is divided into first 120 and second 124 compartments by a wall 128. In general, the first compartment 120 provides a reservoir for air that has been admitted through the filter 112, and provides a protected housing for other components of the fuel cell system 100. These other components may include a controller 132, a pressure sensor 136, an air pump 140 and a cathode air exhaust check valve 144.

Figure 2:
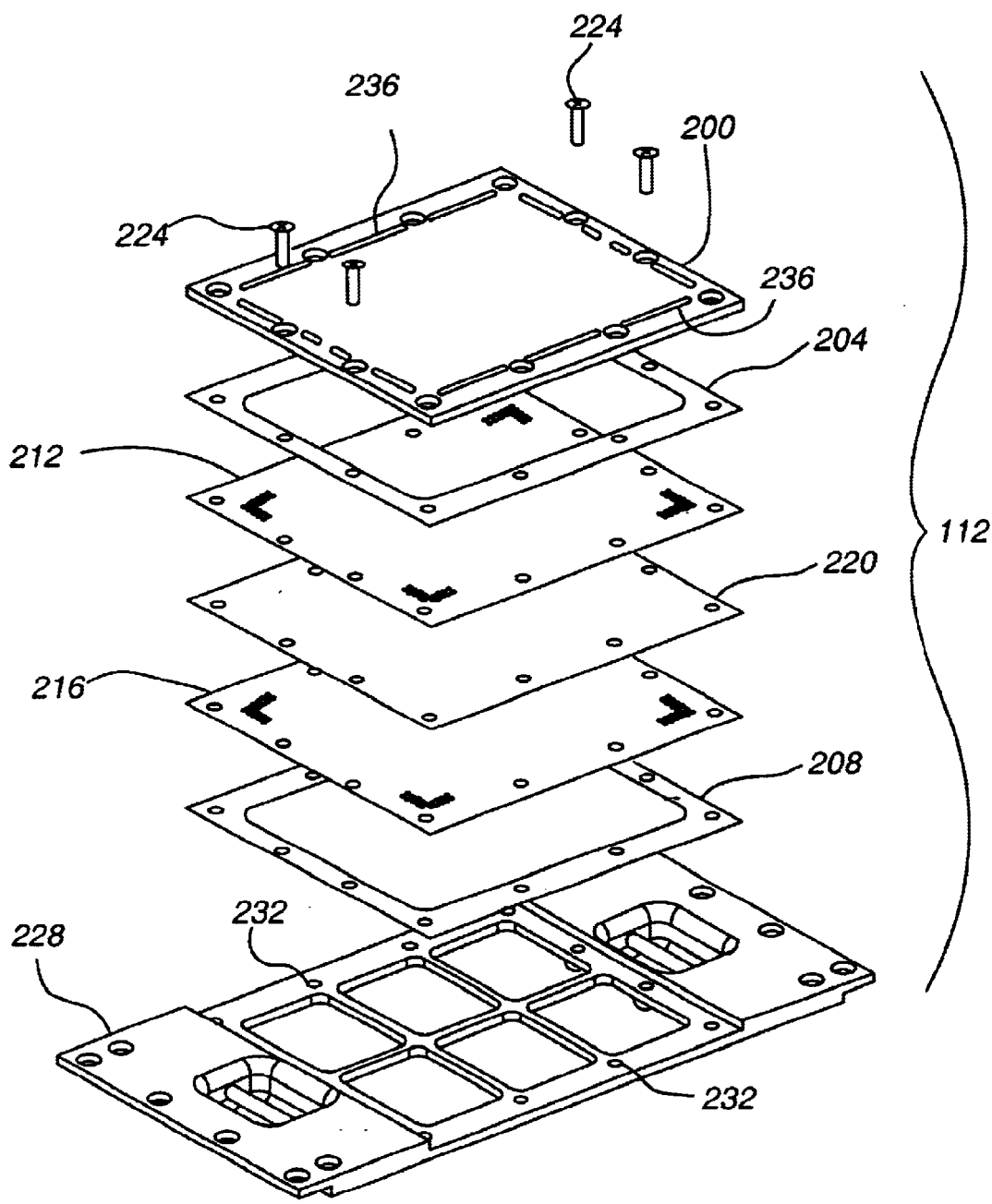
FIG. 2 is an exploded perspective view of a filter assembly in accordance with an embodiment of the present invention.

With reference now to FIG. 2, the components of the filter assembly 112 according to one embodiment of the present invention are illustrated in an exploded view. The filter assembly 112 generally includes a filter cover 200, first 204 and second 208 gaskets, first 212 and second 216 filter grills, and a filter membrane 220. Retainer screws 224 are provided for securing the filter assembly 112 to the side panel 228 of the enclosure 104. As can be appreciated from FIG. 2, although only four retainer screws 224 are shown in FIG. 2, the illustrated filter assembly 112 uses 12 retainer screws 224. When the filter assembly 112 is assembled, the retainer screws 224 pass through corresponding holes in each of the components 200–220 of the filter assembly 112, and are received by threaded holes 232 provided in the side panel 228. Accordingly, when the filter assembly 112 is in place, the gaskets 204, 208, grills 212, 216, and filter membrane 220 are held between the filter cover 200 and the side panel 228.

The filter cover 200 includes a plurality of apertures 236 for admitting air. In general, the apertures 236 are sized so as to prevent objects from contacting the filter grills 212, 216 or the filter's membrane 220 and damaging the filter membrane 220. Therefore, the apertures 236 should be small enough and should be positioned such that they prevent contact with the grills 212, 216 or the membrane 220. However, the apertures 236 should also be large enough to provide an unimpeded flow of air so that the output of the fuel cell stack 108 is not unnecessarily inhibited.

The filter grills 212, 216 provide mechanical support for the filter membrane 220. According to one embodiment of the present invention, the filter grills 212, 216 are configured as a honeycomb type grid, to provide a maximum ratio of open area to support material. So configured, the filter grills 212, 216 can provide the necessary mechanical support to the membrane 220 without unduly inhibiting air flow.

The filter membrane 220, according to one embodiment of the present invention, is constructed from a gas permeable, hydrophobic, microporous, polymer film. For example, the membrane 220 is constructed from polytetrafluoroethylene (PTFE) material. Other suitable materials for the filter membrane 220 include polyethersulfone; Nylon, 6; polyethylene; polypropylene; and acrylic copolymers. The PTFE or other material may be laminated with a woven polymer or other suitable material for strength. When a laminated material is used, the membrane 220 may be from 5 to 10 mils thick, while an unlaminated membrane 220 may be from 1 to 8 microns thick. An unlaminated membrane is advantageous for operation in extreme conditions, including in ambient temperatures of about up to 65° C., as the risk of delamination is eliminated. The thicknesses listed above are examples only, and other thickness may be used provided the desired flow rate and filtering characteristics for the particular application are achieved. The pore size of the material used to construct the membrane 220 is, according to one embodiment of the present invention, from about 0.2 microns to about 1.5 microns. Suitable material for the membrane 220 is available from Pall Corporation, Tetratec Corporation, W. L. Gore & Associates, Inc., and Donaldson Company Inc.

The gaskets 204 and 208 are provided to ensure that a tight seal is formed between the first grill 212 and the filter cover 200, and between the second grill 216 and the side panel 228. Accordingly, the gaskets 204 and 208 are provided to ensure that material passes through the filter membrane 220 if it is to enter the enclosure 104.

In operation, the fuel cell system 100 provides electrical power at the terminals 116 from a reaction between protons obtained from a supply of hydrogen and oxygen supplied from the air surrounding the enclosure 104. The controller 132 commands the air pump 140 to draw air from inside the first compartment 120, and to force that air into the cathode air inlet 148 in proportion to the current drawn from the PEM fuel cell stack 108 through the conductors 116. The pressure drop within the first compartment 120 resulting from operation of the air pump 140 draws ambient air through the filter assembly 112. The filtered air is then available to the air pump 140 as a source of oxygen for the fuel cell cathode.

As is depicted schematically in FIG. 1, the atmosphere surrounding the enclosure 104 typically includes oxygen ($O_2$), nitrogen ($N_2$), and water vapor ($H_2O_{(g)}$). These components of the ambient air are allowed to pass through the filter assembly 112 due to the fact that the oxygen, nitrogen and water vapor molecules are small enough to pass through the pores of the membrane 220. However, larger molecules are not allowed to pass through the pores of the membrane 220. For example, liquid water ($H_2O_{(l)}$), salts (e.g. NaCl), ions (e.g. $Na^+$), metal cations (generally abbreviated $M^+$), metals (generally abbreviated M-X) and particulates (e.g. dirt) are prevented from entering the enclosure 104. Accordingly, the filter assembly 112 of the present invention allows the PEM fuel cell stack 108 to continue operating even if contaminants are present in the environment surrounding the enclosure 104. That is, the filter assembly 112 excludes material that has an adverse effect on the operation of the PEM fuel cell stack 108, and in particular on the operation of the PEM membrane or membranes included as part of the PEM fuel cell stack 108. Furthermore, the illustrated embodiment of the present invention achieves this result without requiring consumable substances, and without employing active measures to prevent aspiration of detrimental material.

The atmospheric integrity of the interior of the enclosure 104 is further ensured by the use of the check valve 144 in the cathode air outlet 152. As an alternative or in addition to the check valve 144, the cathode air outlet 152 may be protected from the outside environment by the filter assembly 112. Alternatively, the cathode air outlet may be protected by a second filter assembly provided for allowing exhaust air to escape while preventing contaminants from entering the enclosure 104.

According to one embodiment of the fuel cell system 100 of the present invention, the enclosure 104, including the side panel 228 in which the filter assembly 112 is mounted, may be immersed in liquid water without damage to the PEM fuel cell stack 108. As described above, the pores of the membrane 220 are sized so as to prohibit liquid water from entering the enclosure 104. Provided the pores of the membrane 220 are made small enough, the ability of the membrane to shed liquid water can be extended to permit the membrane 220 to prohibit the entry of water into the enclosure 104 even when the membrane 220 is immersed. In general, the bubble point of the filter membrane 220 is a function of the membrane's 220 pore size. All other factors being equal, the smaller the pore size, the greater water intrusion pressure that the membrane 220 can withstand. Therefore, the membrane 220 can be designed to withstand immersion at a selected depth (or pressure) by selecting an appropriate pore size. However, as the pore size of the membrane 220 is decreased, the resistance of the membrane 220 to air flow increases. Therefore, it may be necessary to increase the surface area of the membrane 220 in order to provide an acceptable rate of air flow through the membrane 220. The surface area of the membrane may be increased by increasing the area of the enclosure occupied by the filter assembly 112, or by pleating the membrane 220. Where the maximum size of the filter assembly 112 is limited, such as in connection with any application in which it is desirable to provide a compact fuel cell system 100, a balance must be struck between the water intrusion pressure that can be withstood by the membrane 220, and the air flow rate available through the filter assembly 112.

In accordance with one application of an embodiment of the present invention, a pore size of about 1.5 $\mu$m is used to provide a membrane 220 having a bubble point equal to about 6 psig static. Accordingly, such a membrane is capable of excluding water from the interior of the enclosure 104 when the enclosure 104 is submerged in about 12–14 feet of water.

In other applications, where resistance to greater water intrusion pressure is desired, pore sizes as small as 0.2 $\mu$m may be employed. A pore size of 0.2 $\mu$m provides a membrane 220 with a bubble point of greater than 90 psig static, allowing an enclosure 104 to be submerged in up to about 200 feet of water before liquid water will begin to enter the enclosure 104 through the filter assembly 112. Where a maximum flow of gas through the filter assembly 112 is desired, and where the surface area of the membrane 220 must be as small as possible, pore sizes as large as about 1.5 $\mu$m may be used to exclude liquid water and salts. However, it should be noted that an embodiment with a pore size of 1.5 $\mu$m cannot reliably exclude liquid when submerged in more than about 15 feet of water. Although larger pore sizes may be used, (for example 3 $\mu$m) a maximum size of 1.5 $\mu$m has been found to provide useful protection against intrusion by liquid water while providing a high cathode air flow rate.

When the enclosure 104 is submerged, air flow through the filter assembly 112 will be blocked. This blockage will cause the air pressure, within the enclosure 104 to drop rapidly. The pressure sensor 136, located in the first compartment 120 of the enclosure 104 is provided to sense such a drop in pressure. In response to detecting the drop in pressure, the pressure sensor 136 causes the controller 132 to turn off the air pump 140. A battery (not shown) may be provided to maintain a flow of current through the contacts 116. Alternatively, the flow of current through the contacts 116 may be stopped. The exhaust check valve 144 prevents water from entering the PEM fuel cell stack 108 through the cathode air exhaust outlet 152. Once the filter assembly 112 is no longer submerged, and the nonwetting surface of the membrane 220 is cleared of water, air will permeate into the enclosure 104, restoring atmospheric air pressure to the first compartment 120 of the enclosure 104. The pressure sensor 136 provides an indication to the controller 132 that the air pressure has returned to normal, allowing operation of the air pump 140 to recommence. The exhaust check valve 144 will be opened as pressure in the cathode air exhaust outlet 152 rises in response to the injection of air into the PEM fuel cell stack 108 by the air pump 140.

Figure 3:
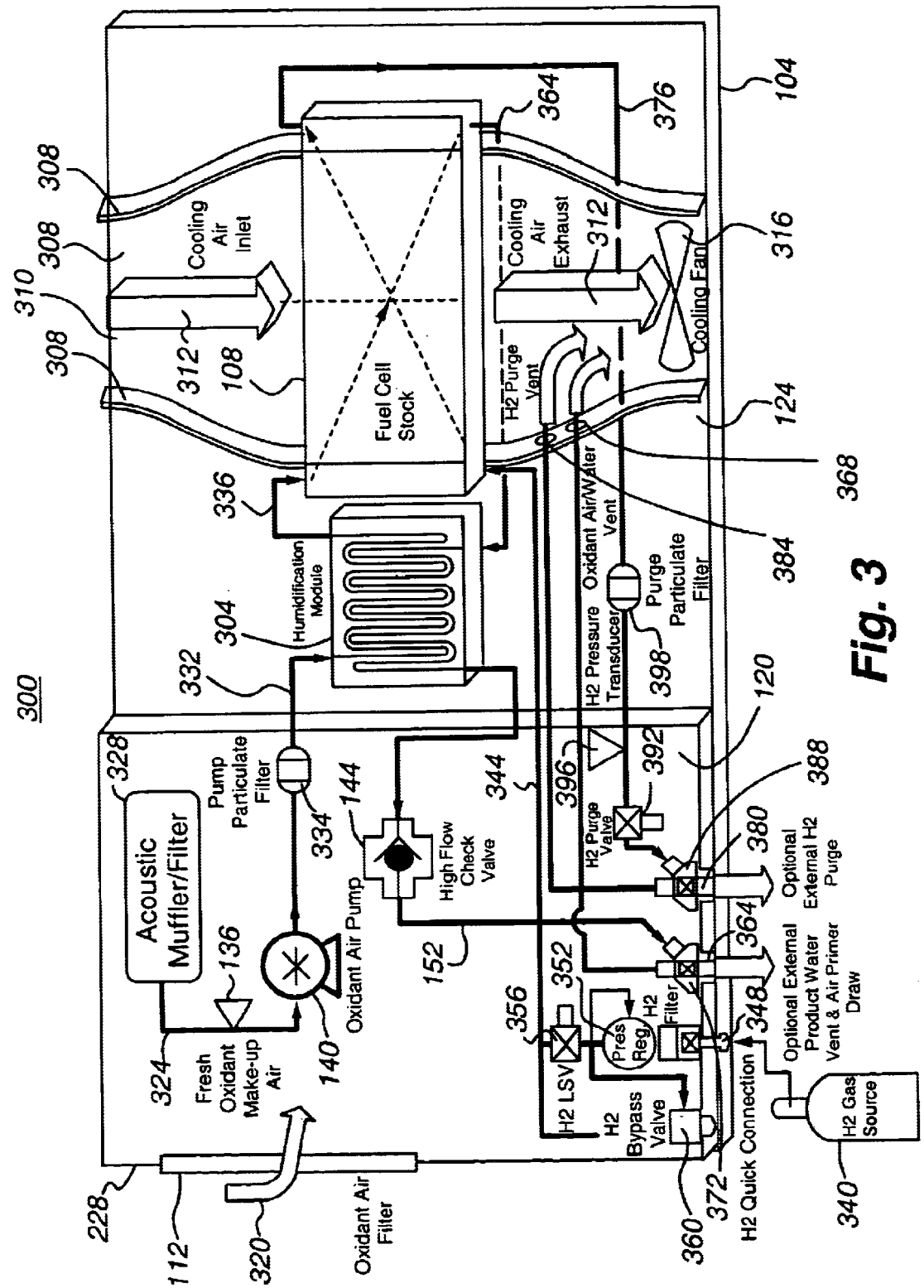
FIG. 3 depicts in schematic form mass flow through a fuel cell apparatus in accordance with an embodiment of the present invention.

With reference now to FIG. 3, mass flow through a fuel cell system or apparatus 300 in accordance with an embodiment of the present invention is depicted in schematic form. In general, the enclosure 104 of the Fuel cell apparatus 300 is divided into first 120 and second 124 compartments. The first compartment 120 houses an air pump 140, a pressure transducer 136 and an exhaust check valve 144. The second compartment 124 generally houses the fuel cell stack 108 and a humidification module 304. The enclosure 104 in the embodiment illustrated in FIG. 3 is provided with partitions 308 that, together with a top partition (not shown in FIG. 3), form a duct 310 to allow cooling air (arrows 312) to be drawn through the fuel cell stack 108 by a cooling fan 316. The partitions 308 are sealed to prevent gasses and liquids in the ambient environment from entering the second compartment 124. In addition, it should be appreciated that the cooling air 312 removes heat from the fuel cell stack 108 without coming into contact with the interior of the fuel cell stack 108 or the second compartment 124. More particularly, the passageway formed by the duct 310 passes through the second compartment 124 without allowing any communication between the atmosphere in the interior of the second compartment 124 and the ambient atmosphere.

When the fuel cell system 300 is in operation, fresh air (arrow 320) is drawn through a filter assembly 112 provided in a side 228 of the enclosure 104. As described above, the filter assembly 112 includes a filter membrane 220 (see FIG. 2) that removes liquids and impurities from the fresh air stream 320. The air is drawn through the filter assembly 112 by the air pump 140. In general, the air pump 140 creates a region of lower than atmospheric pressure in the first compartment 120. The inlet 324 of the air pump 140 may be provided with an acoustic muffler or filter 328 to reduce the acoustic output of the fuel cell system 300 and to remove particulates from the fresh air system 320 introduced by contaminants inside the first compartment 120. The pump 140 outlet 332 provides the fresh air 320 to the humidification module 304. A pump particulate filter 334 may be provided between the pump 140 and the outlet 332 to remove any particulates introduced to the fresh air 320 by the pump 140.

As can be appreciated by those of ordinary skill in the art, the fresh air 320 is relatively dry and cool. In order to ensure an advantageous water balance within the fuel cell stack 108, the humidification module 304 saturates the fresh air 320 with water and raises the temperature of the fresh air 320 to produce humidified air 334 that is provided to the fuel cell stack 108 as the cathode air stream 336.

A hydrogen gas source 340 is interconnected to a hydrogen supply line 344 through a quick connect 348 provided on an exterior of the enclosure 104. A pressure regulator 352 is provided to modulate the pressure of the hydrogen in the supply line 344. A latching solenoid valve 356 operates to selectively provide hydrogen to the fuel cell stack 108 through the hydrogen supply line 344. Alternatively, a bypass valve 360, in parallel with the latching solenoid valve 356, may be manually operated to supply hydrogen to the fuel cell stack 108.

The reaction of protons supplied by the hydrogen gas and oxygen supplied by the cathode air stream 336 produces as byproducts heat and water. A first portion of the heat is removed by the cooling air 312 passing through cooling fins (not shown in FIG. 3) provided as part of the fuel cell stack 108. A second portion of the heat is removed from the fuel cell stack 108 with the water produced from the reaction, and with exhaust air from the cathode. The warm water and cathode exhaust air are provided to the humidification module 304 by humidification supply line 364. The warm water is introduced to the intake air 320 via a hydrophilic membrane in the humidification module 304, and is used to humidify and warm the fresh air 332 before the fresh air 332 is provided as the cathode air stream 336 to the fuel cell 108.

Excess water and the cathode exhaust air is removed from the humidification module 304 through the check valve 144 and via the cathode air outlet 152. The cathode air outlet 152 may exhaust the water and exhaust air through port 364 or vent 368, depending on the position of valve 372. Excess water, hydrogen and other gasses are removed from the fuel cell stack 108 via the water and hydrogen removal line 376. The water, hydrogen and other gasses may be exhausted through port 380 or vent 384 depending on the position of valve 388. A purge valve 392 is intermittently operated to allow the water, hydrogen and other gasses to exit the enclosure 104. In general, the operation of the purge valve 392 is controlled as a function of the current draw on the fuel cell stack 108, or in response to an elevated pressure reading at exhaust pressure transducer 396. A purge particulate filter 398 may be provided in line 376 to prevent the introduction of contaminants to the purge valve 392 during purge operations.

Figure 4:
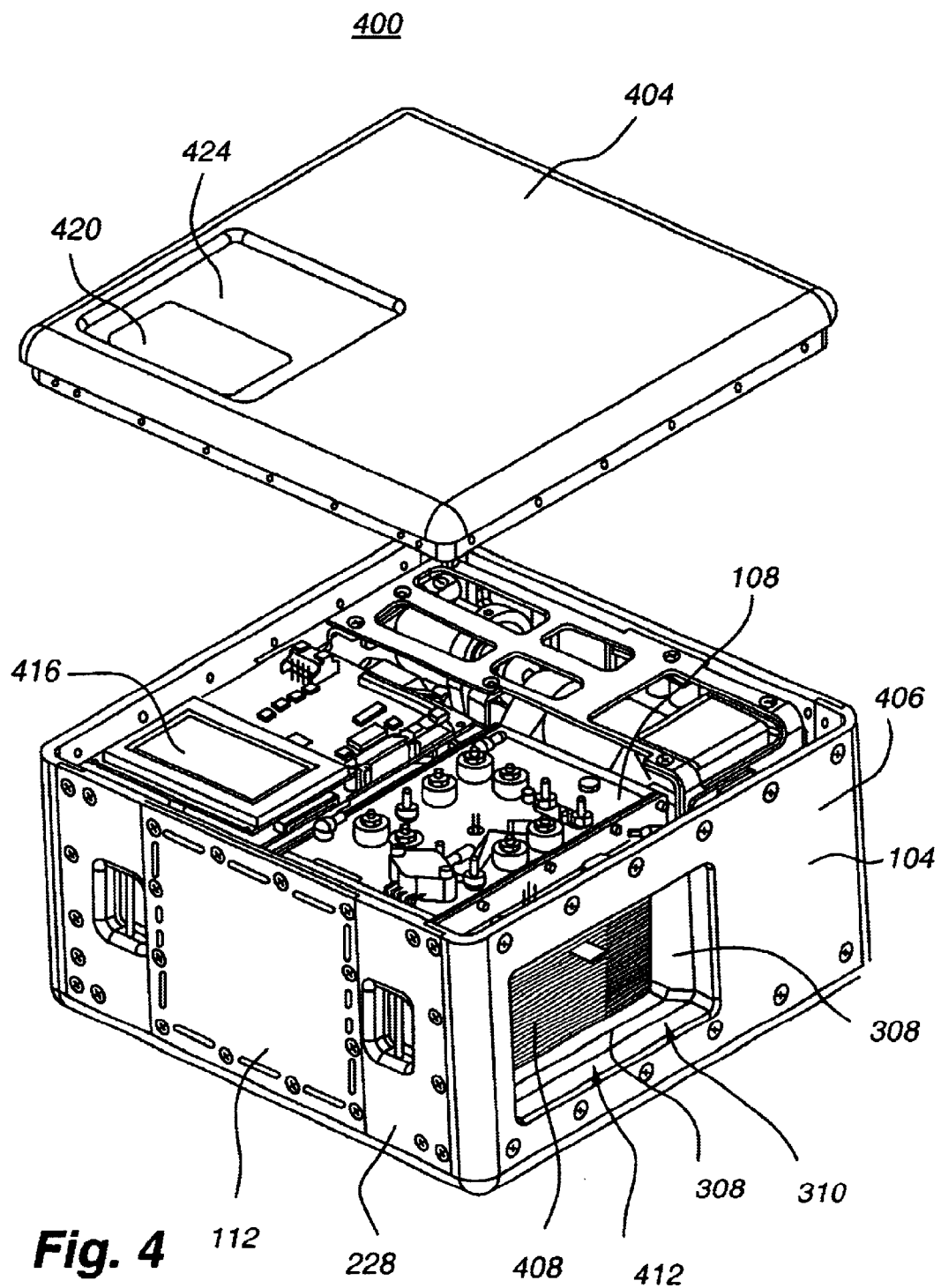
FIG. 4 is a first side perspective view of a fuel cell apparatus in accordance with an embodiment of the present invention, with the cover removed.

With reference now to FIG. 4, a first side perspective view of a fuel cell system or apparatus 400 in accordance with an embodiment of the present invention, is shown, with the top cover 404 removed. In FIG. 4, a first side panel 406 can be seen. In general, the fuel cell apparatus 400 includes an enclosure 104, a fuel cell stack 108, and a filter assembly 112. As shown in FIG. 4, the filter assembly 112 is positioned in a wall 228 of the enclosure 104. Cooling fins 408 for cooling the fuel stack 108 are evident inside the cooling air inlet 412 of the cooling air duct 310.

A liquid crystal display (LCD) 416 is provided for displaying information regarding operational conditions with respect to the fuel cell system 400. When the top cover 404 is in place, information displayed by the LCD 416 can be viewed through a polycarbonate cover 420 in the top cover 404. Adjacent the polycarbonate cover 420 is a membrane keypad 424 to allow an operator to control the operation of the fuel cell system 400. When the top cover 404 is in place, the enclosure 104 is substantially water tight.

Figure 5:
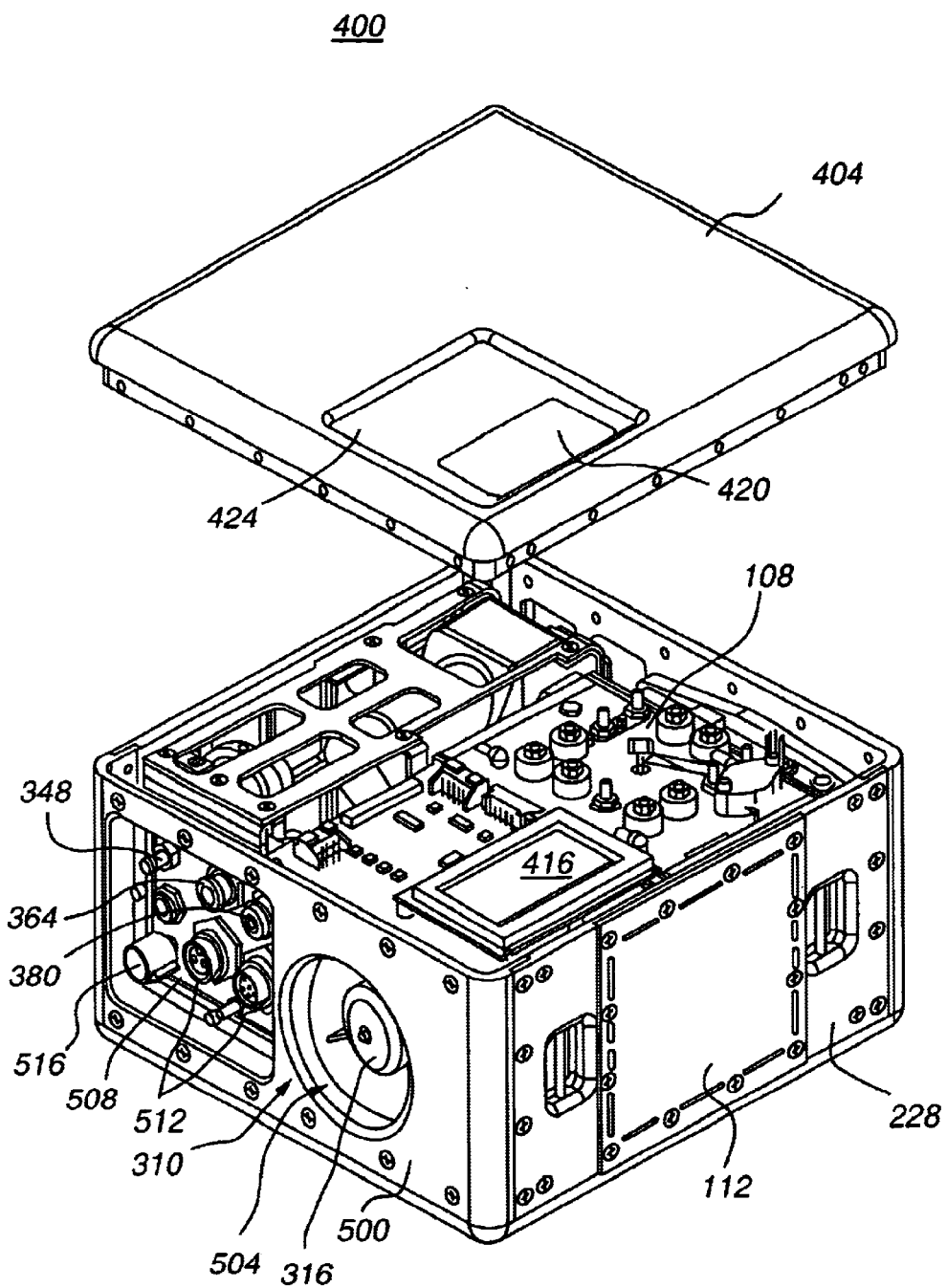
FIG. 5 is a second side perspective view of a fuel cell apparatus in accordance with an embodiment of the present invention, with the cover removed.

With reference now to FIG. 5, a second side perspective view of the fuel cell system 400 also shown in FIG. 4 is illustrated with the top cover 404 removed. In FIG. 5, a second side panel 500 can be seen. Positioned within the second side panel 500 is the outlet 504 of the cooling air duct 310. The cooling fan 316 is positioned within the outlet 504 of the duct 310 to draw cooling air through the cooling fins 408 (see FIG. 4) of the fuel cell stack 108. Although cooling air and other substances are free to pass through the duct 310, the interior of the duct 310 is substantially contiguous, and therefore does not allow cooling air or other substances to enter the interior of the enclosure 104.

A panel 508 provides various connectors and controls. For example, the quick connect 348 and ports 364 and 380 are positioned within the panel 508. Electrical connectors 512 and control knob 516 are additionally provided in the panel 508.

Figure 6:
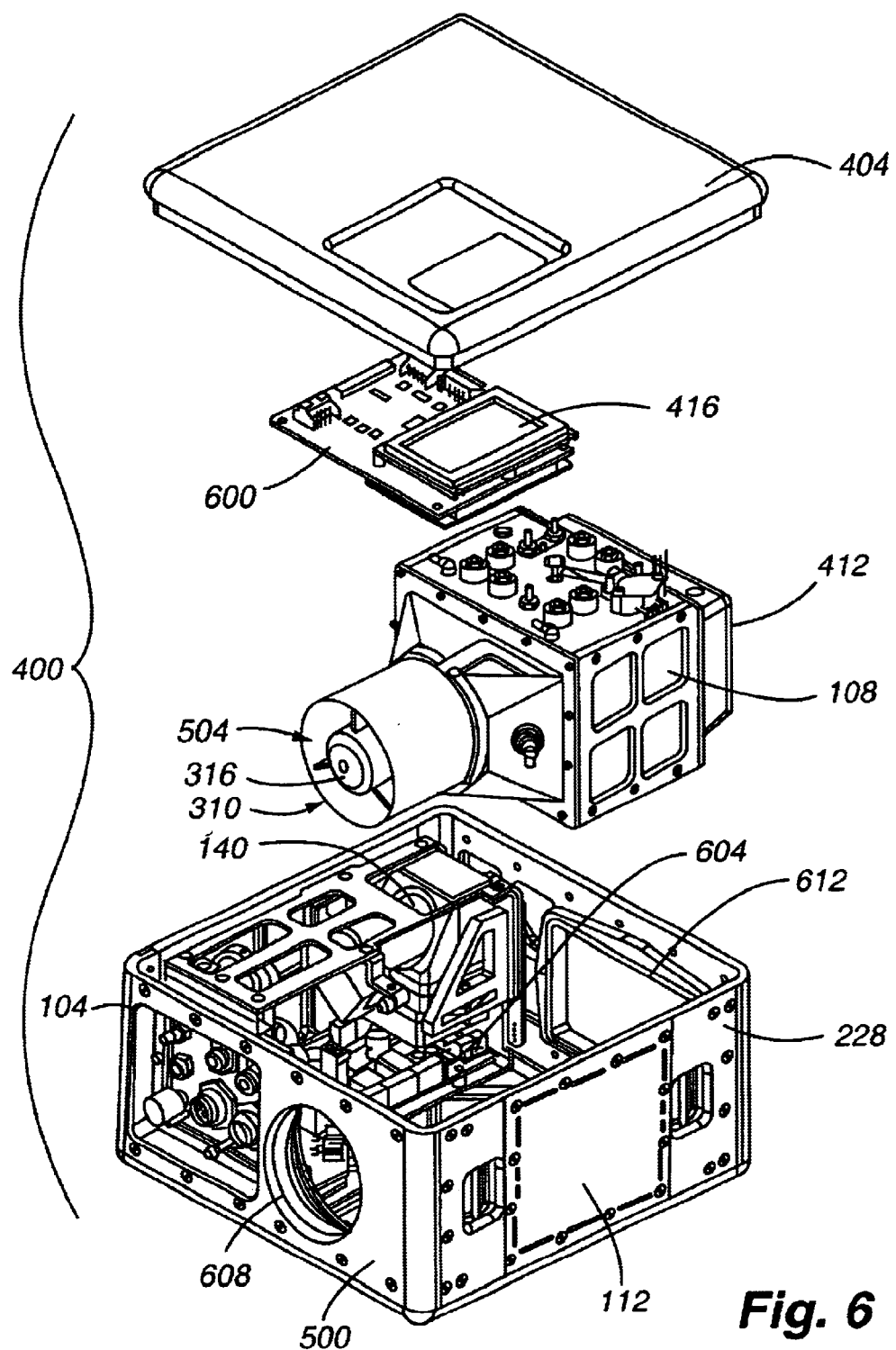
FIG. 6 is an exploded perspective view of a fuel cell apparatus in accordance with an embodiment of the present invention.

With reference now to FIG. 6, an exploded view of the fuel cell system or apparatus 400 is shown. In FIG. 6, a first circuit board 600, which includes the LCD display 416 and various electrical components associated with the operation of the fuel cell system 400 can be seen. In addition, a second circuit board 604 and the air pump 140 are shown in FIG. 6. The fuel cell stack 108 is shown interconnected to duct 310. From the view shown in FIG. 6, it can be appreciated that the outlet 504 of the cooling air duct 310 creates a seal with outlet hole 608 provided in the second side panel 500 to prevent communication between the ambient environment and the interior of the enclosure 104. Similarly, it can be appreciated that the inlet 412 of the cooling air duct creates a seal with the first side panel 406 at the duct inlet hole 612, again to prevent communication between the ambient environment and the interior of the enclosure 104. As noted above, there is no communication between the interior of the duct 310 and the interior of the enclosure 104, or the interior of the fuel cell stack 108. In particular, the duct 310 only allows cooling air drawn into the duct 310 by the fan 316 to pass over the cooling fins 408 (see FIG. 4) of the fuel cell stack 108 to remove excess heat. Vents 368 and 384 (see FIG. 3) may be positioned within the duct 310. However, the vents 368 and 384 are provided as outlets for various gasses and water as described above. Accordingly, a positive pressure is generally present in the vents 368 and 384. Additionally, the lines 152 and 376 connected to the vents 368 and 384 are generally provided with valves (e.g. valves 144 and 392) to allow the venting of substances without allowing substances in the ambient environment to be introduced to the interior of the fuel cell system 400.

In a configuration adapted to produce from 50 to 100 watts of electrical power, the fuel cell system 400 illustrated in FIGS. 4, 5 and 6 includes a filter assembly 112 having a membrane 220 with a pore size of approximately 1.5 $\mu$m. The surface area of the membrane 220 is about 6 sq. in. Accordingly, a filter assembly 112 in accordance with this particular embodiment is capable of admitting about 6 standard liters per minute of air. As an example of the use of a laminated material, the membrane 220 may be formed from TETRATEX 6508 material, available from Tetratec Corporation. As an example of a homogenous, unlaminated material, the membrane 220 may be formed from OLE-GUARD® material available from W. L. Gore & Associates, Inc. So configured, the fuel cell apparatus 400 is capable of withstanding immersion in water up to about 16 ft. deep without admitting contaminants into the fuel cell stack 108.

Although the present invention has been described in terms of a proton exchange membrane fuel cell using hydrogen as a fuel, it should be appreciated that its applicability is not so limited. For example, the present invention may be used in connection with a proton exchange membrane fuel cell using methanol as a fuel, an alkaline fuel cell, a phosphoric acid fuel cell, a molten carbonate fuel cell or a zinc air battery. In general, the disclosed filter can be applied in connection with any device for producing electrical power that requires a clean, particulate and salt-free supply of air in order to operate reliably.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A fuel cell apparatus, comprising:
    a substantially waterproof enclosure;
    a fuel cell disposed within said substantially waterproof enclosure; and
    a filter element that can be subjected to either a first state or a second state, said filter element allows air to enter said substantially waterproof enclosure when subjected to said first state, said filter element contacting liquid with at least a first predetermined pressure when subjected to said second state and excluding the liquid and the air from entering said substantially waterproof enclosure, wherein said exclusion of air from entering said substantially waterproof enclosure results in said fuel cell ceasing operation.

2. The fuel cell apparatus of claim 1, wherein said filter element comprises a membrane.

3. The fuel cell apparatus of claim 2, wherein said membrane is hydrophobic.

4. The fuel cell apparatus of claim 2, wherein said membrane comprises an expanded polytetrafluoroethylene membrane.

5. The fuel cell apparatus of claim 4, wherein said expanded polytetrafluoroethylene membrane is laminated to a woven polymer backing.

6. The fuel cell apparatus of claim 4, wherein said expanded polytetrafluoroethylene membrane is homogenous and unlaminated.

7. The fuel cell apparatus of claim 2, wherein said membrane has a pore size of from about 0.2 micron to about 3 microns.

8. The fuel cell apparatus of claim 1, wherein said fuel cell comprises a proton exchange membrane fuel cell.

9. The fuel cell apparatus of claim 1, wherein said liquids and solids excluded by said filter element comprise salts and aqueous metal ions.

10. A fuel cell apparatus, comprising:
    a substantially waterproof enclosure;
    a fuel cell disposed within said substantially waterproof enclosure;
    a filter element that can be subjected to either a first state or second state, said filter element allows air to enter said substantially waterproof enclosure when subjected to said first state, said filter element contacting liquid with at least a first predetermined pressure when subjected to said second state and excluding the liquid and the air from entering said substantially waterproof enclosure; and a controller in communication with said air pump, each of said air pump, and said controller disposed within said substantially waterproof enclosure, wherein air is drawn into said enclosure through said filter element in said first state and said controller stops operation of said air pump in said second state.

11. A method for maintaining fuel cell cathode air quality, comprising:

disposing a fuel cell within a waterproof enclosure;

admitting an air stream from an exterior of said waterproof enclosure and to an interior of said waterproof enclosure through a filter, wherein said filter excludes salts and aqueous metal ions from said interior of said waterproof enclosure;

providing said air stream to said fuel cell, wherein a voltage is produced by said fuel cell;

contacting said filter with a liquid, wherein a surface area of said filter is substantially in contact with said liquid; and after said step of contacting, ceasing to provide said air stream to said fuel cell, wherein a voltage is not produced by said fuel cell.

12. The method of claim 11, wherein said filter comprises a hydrophobic gas permeable membrane, and wherein a pore size of said membrane is selected so that a water intrusion pressure of said filter is greater than or equal to 6 psig.

13. The method of claim 11, further comprising providing oxygen included in said air stream to a proton exchange membrane fuel cell.

14. The method of claim 11, further comprising:

removing said filter from contact with said liquid; and after said step of removing, providing said air stream to said fuel cell, wherein a voltage is produced by said fuel cell.

15. The method of claim 11, wherein said admitting an air stream comprises drawing air from an exterior of said waterproof enclosure.

16. A fuel cell apparatus, comprising:

a substantially waterproof enclosure;

a fuel cell disposed within said substantially waterproof enclosure;

an air pump;

a controller in communication with said air pump and each of said controller and said air pump is contained within said substantially waterproof enclosure; and a filter element for allowing air to enter said substantially waterproof enclosure and substantially preventing liquids and solids from entering said substantially waterproof enclosure, wherein said controller controls said air pump in response to detecting a change in a condition within said substantially waterproof enclosure.

17. The fuel cell apparatus of claim 16, further comprising:

a pressure sensor contained within said substantially waterproof enclosure, wherein said change in a condition comprises a change in pressure within said substantially waterproof enclosure.

18. The fuel cell apparatus of claim 17, wherein said filter element contacts liquid and said contact is detected by said pressure sensor as said change in pressure within said substantially waterproof enclosure.

19. The fuel cell apparatus of claim 17, wherein:

said pressure change is a decrease in pressure.

20. The fuel cell apparatus of claim 17, wherein:

said change in pressure is to a first predetermined pressure or less from a pressure greater than said first predetermined pressure and said air pump is deactivated using said controller at said first predetermined pressure or less and said controller activates said air pump at a pressure greater than said first predetermined pressure.

21. A fuel cell apparatus, comprising:

a substantially waterproof enclosure, said enclosure including an interior volume, wherein liquid water in an atmosphere surrounding said enclosure is excluded from said interior volume at least up to a predetermined water pressure;

a fuel cell disposed within said interior volume; and said enclosure including an exterior surface, at least a portion of which includes a filter assembly that operates to admit atmospheric air to said interior volume and to exclude said liquid water from said interior volume, at least up to said predetermined water pressure.

22. The enclosure of claim 21, wherein said filter assembly includes a hydrophobic membrane.

23. The enclosure of claim 22, wherein said hydrophobic membrane is substantially planar.

24. The enclosure of claim 21, wherein said exterior surface includes a first planar surface and wherein said filter assembly is located within a perimeter of said first planar surface.

25. The enclosure of claim 22, wherein said filter assembly further includes:

a first backing member on a first side of said hydrophobic membrane; and a second backing member on a second side of said hydrophobic membrane.

* * * * *